US 6,751,206 B1

(12) United States Patent
Padovani et al.

(10) Patent No.: US 6,751,206 B1
(45) Date of Patent: Jun. 15, 2004

(54) METHOD AND APPARATUS FOR BEAM SWITCHING IN A WIRELESS COMMUNICATION SYSTEM

(75) Inventors: Roberto Padovani, San Diego, CA (US); Paul E. Bender, San Diego, CA (US); Ahmad Jalali, San Diego, CA (US); Bruce Judson, San Diego, CA (US); Charles E. Wheatley, III, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 667 days.

(21) Appl. No.: 09/608,173

(22) Filed: Jun. 29, 2000

(51) Int. Cl.⁷ .............................................. H04B 7/204
(52) U.S. Cl. ...................... 370/335; 370/336; 455/562
(58) Field of Search ................... 370/335, 336, 370/337, 342, 347; 455/446, 561, 562, 515

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,267,261 A | | 11/1993 | Blakeney, II et al. |
| 5,448,753 A | * | 9/1995 | Ahl et al. ................. 455/422.1 |
| 5,504,773 A | | 4/1996 | Padovani et al. |
| 5,625,876 A | | 4/1997 | Gilhousen et al. |
| 5,825,761 A | * | 10/1998 | Tanaka et al. ............... 370/333 |
| 5,903,554 A | | 5/1999 | Saints |
| 5,923,650 A | | 7/1999 | Chen et al. |
| 5,933,462 A | | 8/1999 | Viterbi et al. |
| 6,069,885 A | * | 5/2000 | Fong et al. ................. 370/336 |
| 6,122,266 A | * | 9/2000 | Lynch ......................... 370/335 |
| 6,262,980 B1 | * | 7/2001 | Leung et al. ................ 370/336 |
| 6,330,458 B1 | * | 12/2001 | Lamoureux et al. ......... 455/561 |
| 6,335,922 B1 | | 1/2002 | Tiedemann, Jr. et al. |
| 6,505,035 B2 | * | 1/2003 | Ue et al. ....................... 455/69 |

FOREIGN PATENT DOCUMENTS

| | | |
|---|---|---|
| EP | 0963129 A2 | 12/1999 |
| WO | 90/03071 | 3/1990 |
| WO | 98/29988 | 7/1998 |
| WO | 99/39532 | 8/1999 |

OTHER PUBLICATIONS

R. Pirhonen et al. "TDMA Bases Packet Data System Standard and Deployment," Vehicular Technology Conference, 1999 1333 Houston TX, USA, May 16–20, 1999, pp. 743–747.

* cited by examiner

*Primary Examiner*—Min Jung
(74) *Attorney, Agent, or Firm*—Philip Wadsworth; Thien T. Nguyen; Maryanne E. DeAngelo

(57) ABSTRACT

In a CDMA data communication system capable of variable rate transmission, utilization of beam switching techniques decreases the average interference caused by transmissions of a base station to subscriber stations within a cell, and in neighboring cells. Base stations utilize multiple transmit antennas, each transmitting signals at controlled amplitudes and phases, to form transmit signal corresponding to sector divisions. Data and reference signals are transmitted along sector division beams that alternate according to fixed time slots in order to increase system capacity and data rates by maximizing carrier-to-interference ratios (C/I) measured at subscriber stations.

10 Claims, 6 Drawing Sheets

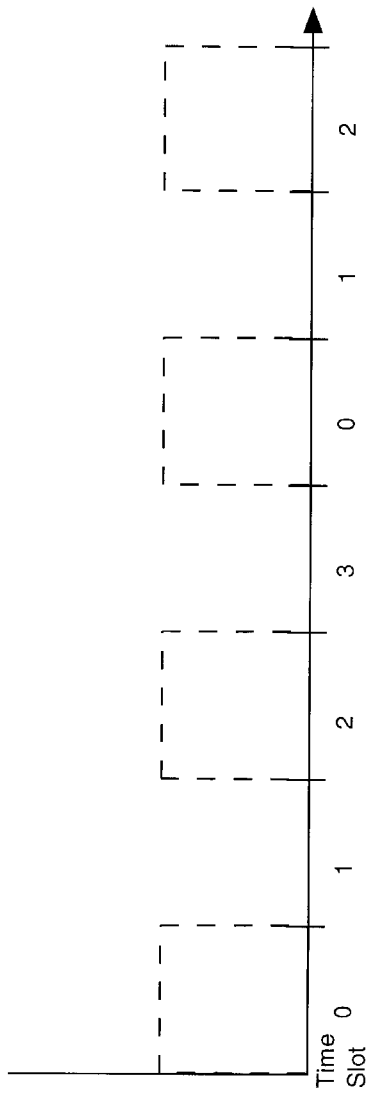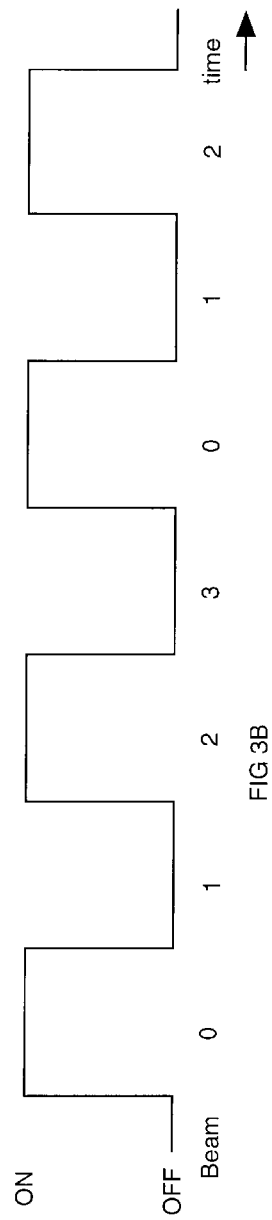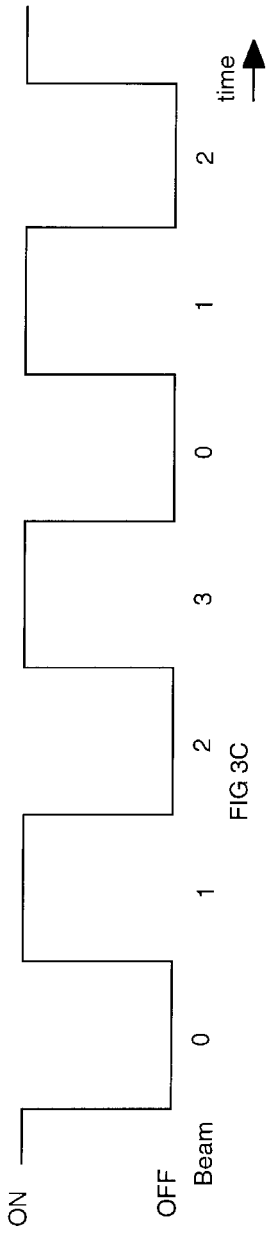

METHOD AND APPARATUS FOR BEAM SWITCHING IN A WIRELESS COMMUNICATION SYSTEM

BACKGROUND OF THE INVENTION

I. Field of the Invention

The current invention relates to wireless data communication. More particularly, the present invention relates to a novel and improved method and apparatus for high rate packet data transmission in a wireless communication system.

II. Description of the Related Art

A modern day communication system is required to support a variety of applications. One such communication system is a code division multiple access (CDMA) system which conforms to the "TIA/EIA/IS-95 Mobile Station-Base Station Compatibility Standard for Dual-Mode Wideband Spread Spectrum Cellular System," hereinafter referred to as the IS-95 standard. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated by reference herein.

In this specification, base station refers to the hardware with which the subscriber stations communicate. Cell refers to the hardware or the geographic coverage area, depending on the context in which the term is used. A sector is a partition of a cell. A sub-sector is a division of a sector. Because a sector, and a sub-sector of a CDMA system have the attributes of a cell, the teachings described in terms of cells are readily extended to sectors and sub-sectors.

In a CDMA system, communications between users are conducted through one or more base stations. A first user on one subscriber station communicates to a second user on a second subscriber station by transmitting data on a reverse link to a base station. The base station receives the data and can route the data to another base station. The data is transmitted on the forward link of the same base station, or a second base station, to the second subscriber station. The forward link refers to transmission from the base station to a subscriber station and the reverse link refers to transmission from the subscriber station to a base station. In IS-95 systems, the forward link and the reverse link are allocated separate frequencies.

The subscriber station communicates with at least one base station during a communication. CDMA subscriber stations are capable of communicating with multiple base stations simultaneously during soft handoff. Soft handoff is the process of establishing a link with a new base station before breaking the link with the previous base station. Soft handoff minimizes the probability of dropped calls. A method and system for providing a communication with a subscriber station through more than one base station during the soft handoff process are disclosed in U.S. Pat. No. 5,267,261, entitled "MOBILE ASSISTED SOFT HANDOFF IN A CDMA CELLULAR TELEPHONE SYSTEM," assigned to the assignee of the present invention and incorporated by reference herein. Softer handoff is the process whereby the communication occurs over multiple sectors which are serviced by the same base station. The process of softer handoff is described in detail in U.S. Pat. No. 5,625,876, entitled "METHOD AND APPARATUS FOR PERFORMING HANDOFF BETWEEN SECTORS OF A COMMON BASE STATION," assigned to the assignee of the present invention and incorporated by reference herein.

Given the growing demand for wireless data applications, the need for very efficient wireless data communication systems has become increasingly significant. The IS-95 standard is capable of transmitting data traffic and voice traffic over the forward and reverse links. A method for transmitting data traffic in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention and incorporated by reference herein. In accordance with the IS-95 standard, the data traffic or voice traffic is partitioned into code channel frames which are 20 msec wide with data rates as high as 14.4 Kbps.

Transmission of high-rate data traffic and voice traffic over the forward and reverse links is proposed in a high-data-rate standard. In accordance with the proposed high-data-rate standard, the data traffic or voice traffic is partitioned into time slots of variable duration. A code channel frame comprises one to sixteen time slots. Beamforming techniques for decreasing interference caused by transmissions of a base station to subscriber stations in neighboring cells are described in detail in U.S. patent application Ser. No. 09/388,267, filed Sep. 1, 1999, entitled "METHOD AND APPARATUS FOR BEAMFORMING IN A WIRELESS SYSTEM," assigned to the assignee of the present invention and incorporated by reference herein.

A significant difference between voice services and data services is the fact that voice services impose stringent and fixed delay requirements. Typically, the overall one-way delay of speech frames must be less than 100 msec. In contrast, the data delay can become a variable parameter used to optimize the efficiency of the data communication system. Specifically, more efficient error correcting coding techniques which require significantly larger delays than those that can be tolerated by voice services can be utilized. An exemplary efficient coding scheme for data is disclosed in U.S. patent application Ser. No. 08/743,688, now patented, U.S. Pat. No. 5,933,462 entitled "SOFT DECISION OUTPUT DECODER FOR DECODING CONVOLUTIONALLY ENCODED CODEWORDS," filed Nov. 6, 1996, assigned to the assignee of the present invention, and incorporated by reference herein.

Another significant difference between voice services and data services is that voice services require a fixed and common grade of service (GOS) for all users. Typically, for digital systems providing voice services, this translates into a fixed and equal transmission rate for all users and a maximum tolerable value for the error rates of the speech frames. In contrast, for data services, the GOS can be different from user to user and can be a parameter optimized to increase the overall efficiency of the data communication system. The GOS of a data communication system is typically defined as the total delay incurred in the transfer of a predetermined amount of data, hereinafter referred to as a data packet.

Yet another significant difference between voice services and data services is that voice services require a reliable communication link which, in the exemplary CDMA communication system, is provided by soft handoff. Soft handoff results in redundant transmissions from two or more base stations to improve reliability. However, this additional reliability is not required for data transmission because the data packets received in error can be retransmitted. For data services, the transmit power used to support soft handoff can be more efficiently used for transmitting additional data.

The parameters which measure the quality and effectiveness of a data communication system are the transmission delay required to transfer a data packet and the average throughput rate of the system. Transmission delay does not have the same impact in data communication as it does for voice communication, but it is an important metric for measuring the quality of the data communication system. The average throughput rate is a measure of the efficiency of the data transmission capability of the communication system.

It is well known that in cellular systems the carrier-to-interference ratio C/I of any given user is a function of the location of the user within the coverage area. In order to maintain a given level of service, TDMA and FDMA systems resort to frequency reuse techniques, i.e. not all frequency channels and/or time slots are used in each base station. In a CDMA system, the same frequency allocation is reused in every cell of the system, thereby improving the overall efficiency. The C/I that any given user's subscriber station achieves determines the information rate that can be supported for this particular link from the base station to the user's subscriber station. Given the specific modulation and error correction method used for the transmission, a given level of performance is achieved at a corresponding level of C/I. For an idealized cellular system with hexagonal cell layouts and utilizing a common frequency in every cell, the distribution of C/I achieved within the idealized cells can be calculated. An exemplary system for transmitting high-rate digital data in a wireless communication system is disclosed in copending U.S. patent application Ser. No. 08/963,386, now patented, U.S. Pat. No. 6,574,211 entitled "METHOD AND APPARATUS FOR HIGHER RATE PACKET DATA TRANSMISSION," (hereafter the '386 application), filed Nov. 3, 1997, assigned to the assignee of the present application, and incorporated by reference herein.

It is also well known that much of the signal interference in a loaded CDMA system is caused by transmitters belonging to the same CDMA system. In an effort to increase capacity and data rates by reducing interference, cells are often divided into sectors or smaller cells operating at lower power. However, conventional methods are costly and difficult to apply in areas having widely varying signal propagation properties. Conventional methods also typically have poor signal quality near sector boundaries. There is a need for a simplified way of decreasing the mutual interference between elements in the system, while increasing system capacity and data rates.

SUMMARY OF THE INVENTION

The disclosed embodiments provide a novel and improved method of increasing CDMA data communication system capacity and data rates by maximizing carrier-to-interference ratios (C/I) measured at subscriber stations. Utilization of beam switching techniques decreases the interference caused by transmissions of a base station to subscriber stations within sectors of a cell, and its neighboring cells. Base stations utilize multiple transmit antennas, each transmitting signals at controlled amplitudes and phases, to form transmit signal beams corresponding to sector divisions, or sub-sectors. Data and reference signals are transmitted along sector division beams that alternate according to fixed time slots in order to focus energy at subscriber stations without interference from neighboring beams.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3 illustrates sector division beams alternating according to fixed time slots;

DETAILED DESCRIPTION OF THE PREFERRED EMBODIMENTS

The disclosed embodiments improve the efficiency of a CDMA system by providing a strong forward link signal to a destination subscriber station while causing minimal interference to other subscriber stations.

The disclosed embodiments provide an approach to maximizing capacity in a high-data-rate wireless system by adapting fixed beam switching techniques for use in terrestrial wireless applications. In accordance with the disclosed embodiments, a cellular system with multiple transmit antennas at each base station is described. From each base station, the same signal, but each having different relative phase shifts and power levels, is transmitted from each antenna in order to focus energy in a sub-sector, the portion of a sector where a subscriber station is located. In order to maximize the carrier-to-interference ratio (C/I) of the intended receiver of the signal (usually a single subscriber station) the amplitudes and phases of the signals being transmitted from each of the transmit antennas must be set appropriately.

Any signal quality metric that is based on the estimated C/I may be used by the subscriber station as feedback to the base station. In the exemplary high-data-rate wireless communication system described in the '386 application, the subscriber station determines a data rate at which it can successfully receive packets based on its estimated C/I. The data rate, instead of the C/I measurement, is sent to the base station in the form of a data rate control (DRC) signal. The DRC information is embedded in the reverse link signal sent by the subscriber station. The base station may also use the changes in the DRC signal to determine the time slot in which to transmit data to the subscriber station.

Conventionally, a single beam is transmitted in a sector which covers the entire sector regardless of the receiver's location within the sector. A single beam wastes energy where the subscriber station cannot receive it, and interferes with other users. The disclosed embodiments maximize the carrier-to-interference ratio (C/I) at the subscriber station by dividing sectors into sub-sectors and transmitting fixed beams directly to each sub-sector where subscriber stations are located, alternating between non-adjacent sub-sectors to reduce interference.

Figure 1:
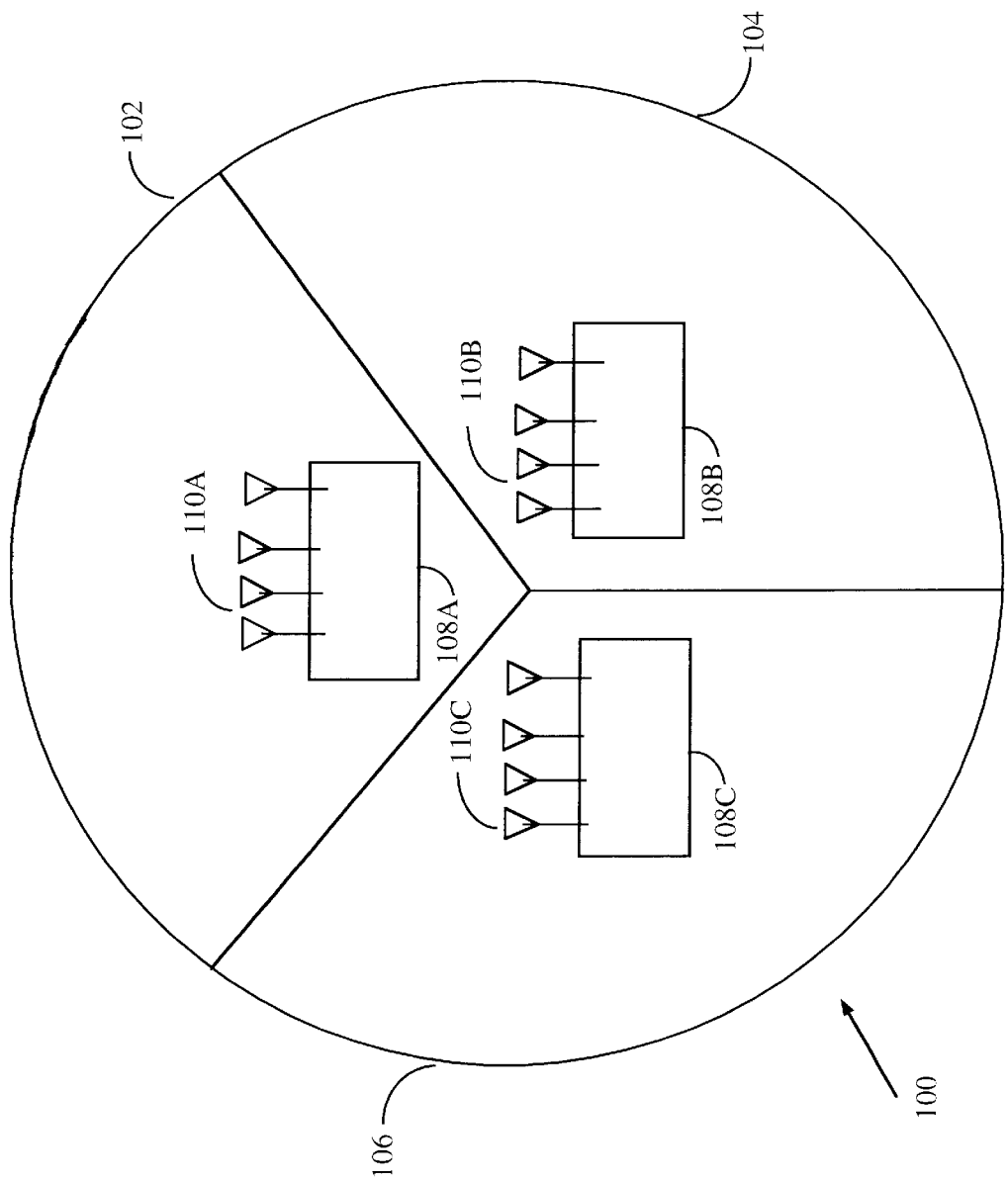
FIG. 1 is a diagram of terrestrial base stations configured in accordance with one embodiment.

FIG. 1 shows a diagram of terrestrial base stations configured in a three-sector cell. Cell 100 comprises three sectors 102, 104, 106. In the illustrated embodiment, a base station 108 is located in each sector of the cell 100. In other embodiments, a single base station may serve two or more sectors of a cell. The base stations 108 transmit fixed beams through four transmit antennas 110. Though each base station 108 is shown )with four transmit antennas 110, the disclosed embodiment is applicable to a base station having one or more transmit antennas, including one which utilizes a directional antenna array. In addition, one skilled in the art will appreciate that antennas of a variety of type and polarization may be used, including e.g. omni-directional and directional antennas. In addition, one antenna used for transmission from a base station may be of a different type than other antennas used by the same base station.

The antenna elements 110 form a phased array for each sector 102, 104, 106, configured to create a number of fixed beams per sector 102, 104, 106. In the particular embodiment shown, there are four fixed beams per sector 102, 104, 106. The signals transmitted through the plurality of antennas 110 of a single base station 108 are advantageously identical, except for differences in transmit amplitude and phase. When transmitting a signal, the base station 108 adjusts the amplitude and phase of the signals transmitted through the antennas 110 to form fixed signal beams directed at fixed divisions, or sub-sectors, of the sector 102, 104, 106 the base station 108 serves.

In general, a base station 108 using beam switching to transmit to-sub-sector divisions causes less interference to subscriber stations in neighboring sub-sectors than a base station 108 transmitting through a single antenna to the entire sector 102, 104, 106.

Figure 2:
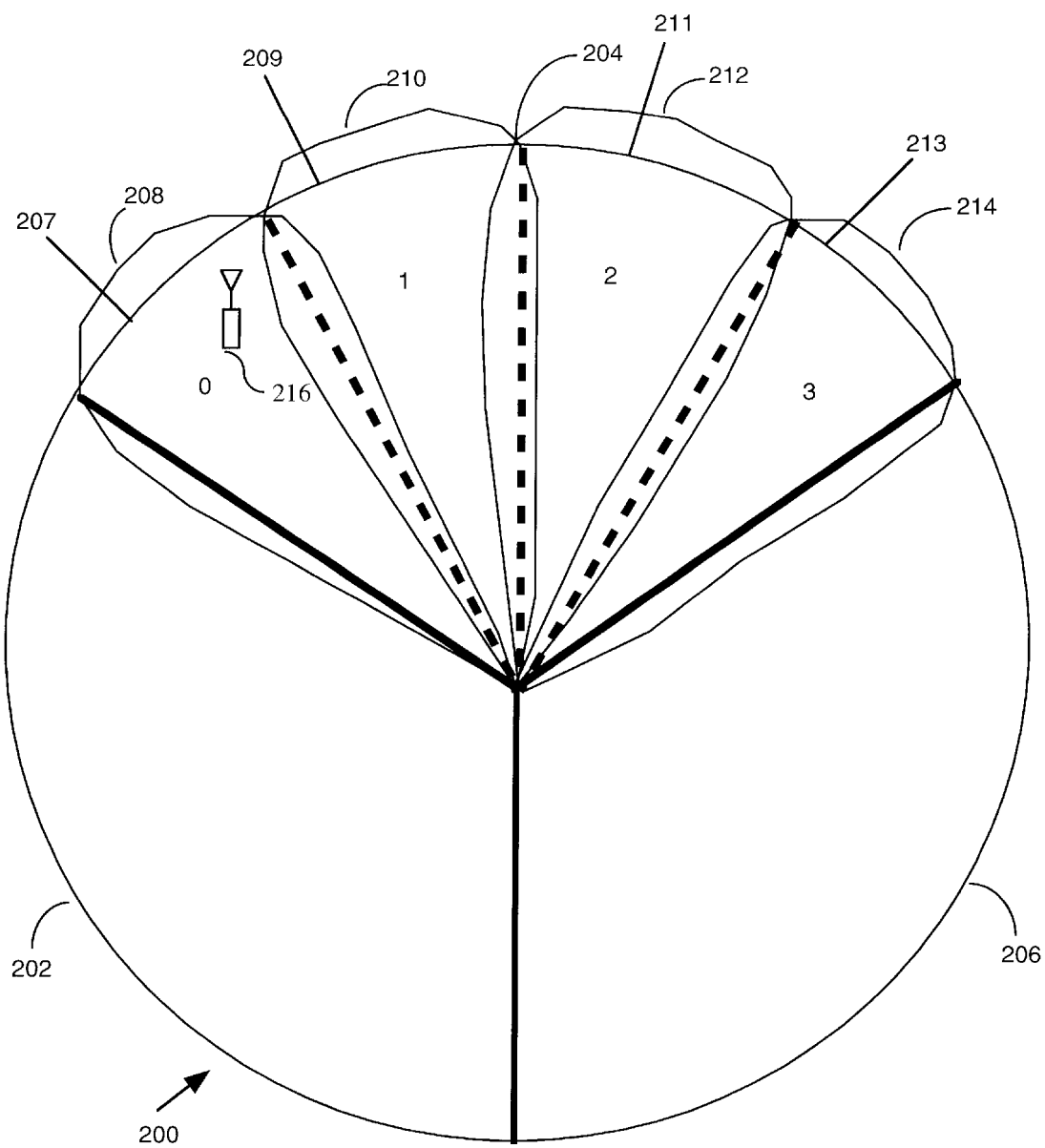
FIG. 2 illustrates a subdivided sector in accordance with one embodiment.

FIG. 2 illustrates an exemplary cell 200 comprising three sectors 202, 204, 206. A sector 204 divided into four sub-sectors 0 207, 1 209, 2 211, and 3 213 is shown. Each sub-sector 207, 209, 211, 213 is covered by a fixed transmission beam 208, 210, 212, 214 (respectively) generated by the antenna elements of the base station (not shown) serving the sector 204. Advantageously, alternating sub-sectors 207, 209, 211, 213 are designated as even or odd. Sub-sectors 0 207 and 2 211 are designated as even sub-sectors, while sub-sectors 1 209 and 3 213 are designated as odd sub-sectors. Advantageously, data transmission slots are also identified by even and odd numbers. The sub-sector transmission beams 208, 210, 212, 214 remain fixed regardless of the location of subscriber station 216 within the sector 204. The subscriber station 216 selects the best beam 208, 210, 212, 214 by measuring the C/I of available pilots. In the disclosed embodiment, transmissions are CDMA signals, wherein the transmissions of base stations serving other subscriber stations and cell areas often cause the majority of the interference experienced by a receiving subscriber station 216. In the disclosed embodiment, each subscriber station 216 performs estimates of C/I, or carrier-to-interference ratio. The resulting C/I measurement information is converted to a data rate control (DRC) signal. The DRC, instead of the C/I measurement, is then transmitted from each subscriber station 216 to its serving base station. The base station transmits at a fixed power level, but varies the data rate used to transmit to each subscriber station 216 according to the DRC information received from that subscriber station 216. Subscriber station 216 performs measurements of C/I in order to send its base station DRC information used to choose a data rate for transmissions on the forward link. If the amount of interference to subscriber station 216 is great, then the base station transmits to subscriber station 216 at a low data rate. Conversely, if the interference to subscriber station 216 is small, then the base station transmits to subscriber station 216 at a high data rate.

Interference to subscriber stations 216 in conventional cellular communications systems is greater at cell and sector boundaries where beams overlap. Conventionally, a subscriber station 216 at a sub-sector boundary will communicate with either sub-sector transmission beam, but neighboring beams will interfere with each other causing the C/I to be low. The disclosed embodiments eliminate interference near sub-sector boundaries using simple method of alternating transmissions on even 208, 212 and odd 210, 214 numbered sub-sector beams during odd and even transmission time slots. During even time slots, only even beams 208, 212 are transmitted. Amplitude and phase coefficients of odd signal beams 210, 214 are set to 0 during even time slots. During odd transmission time slots, only odd beams 210, 214 are transmitted. Amplitude and phase coefficients of even signal beams 208, 212 are set to 0 during odd transmission time slots. In a given time slot, two of four sets of beams are active. Eliminating interference (I) boosts C/I, increasing system capacity and data rates. The alternating beam switching method of the disclosed embodiment, with six sub-sectors of a twelve sub-sector cell transmitting during a given time slot, performs better than a conventional six sector cell configuration with boundary interference. The alternating beam switching method of the disclosed embodiment provides subscriber stations 216 located near boundaries with good receive signal quality, enabling the subscriber stations 216 to request higher data rates.

One skilled in the art would understand that a cell could be arbitrarily divided into sections, or any permutation of sectors and sub-sectors, without departing from the scope of the present invention FIGS. 3 A,B, and C are timing diagrams illustrating fixed sub-sector division beams alternating according to fixed transmission time slots.

FIG. 3A shows an instance of activated even time slots, and deactivated odd time slots, at a given time.

FIG. 3B shows base station transmission occurring for even numbered beams 0 and 2 during the given activated even transmission time slot.

FIG. 3C shows base station transmission not occurring for odd numbered beams 1 and 3 during the given activated even transmission time slot.

The disclosed embodiments advantageously identify even and odd transmission time slots, and corresponding even and odd sub-sector transmission beams. Even numbered signal beams are transmitted only during even numbered transmission time slots. Odd numbered signal beams are transmitted only during odd numbered transmission time slots. During any given time slot, half the sub-sector transmission beams will be activated while half the sub-sector transmission beams will be deactivated. Interference from neighboring transmission beams is advantageously eliminated with the alternate beam switching method of the disclosed embodiments.

Base stations maintain knowledge of subscriber stations located in their sub-sector coverage areas using DRC messages received from subscriber stations. The same signal is transmitted to all the sub-sectors of a sector regardless of the location of the subscriber station. The need for complicated tracking methods and smart antenna schemes for improving C/I is eliminated by the simplicity of the disclosed embodiments.

Figure 4:
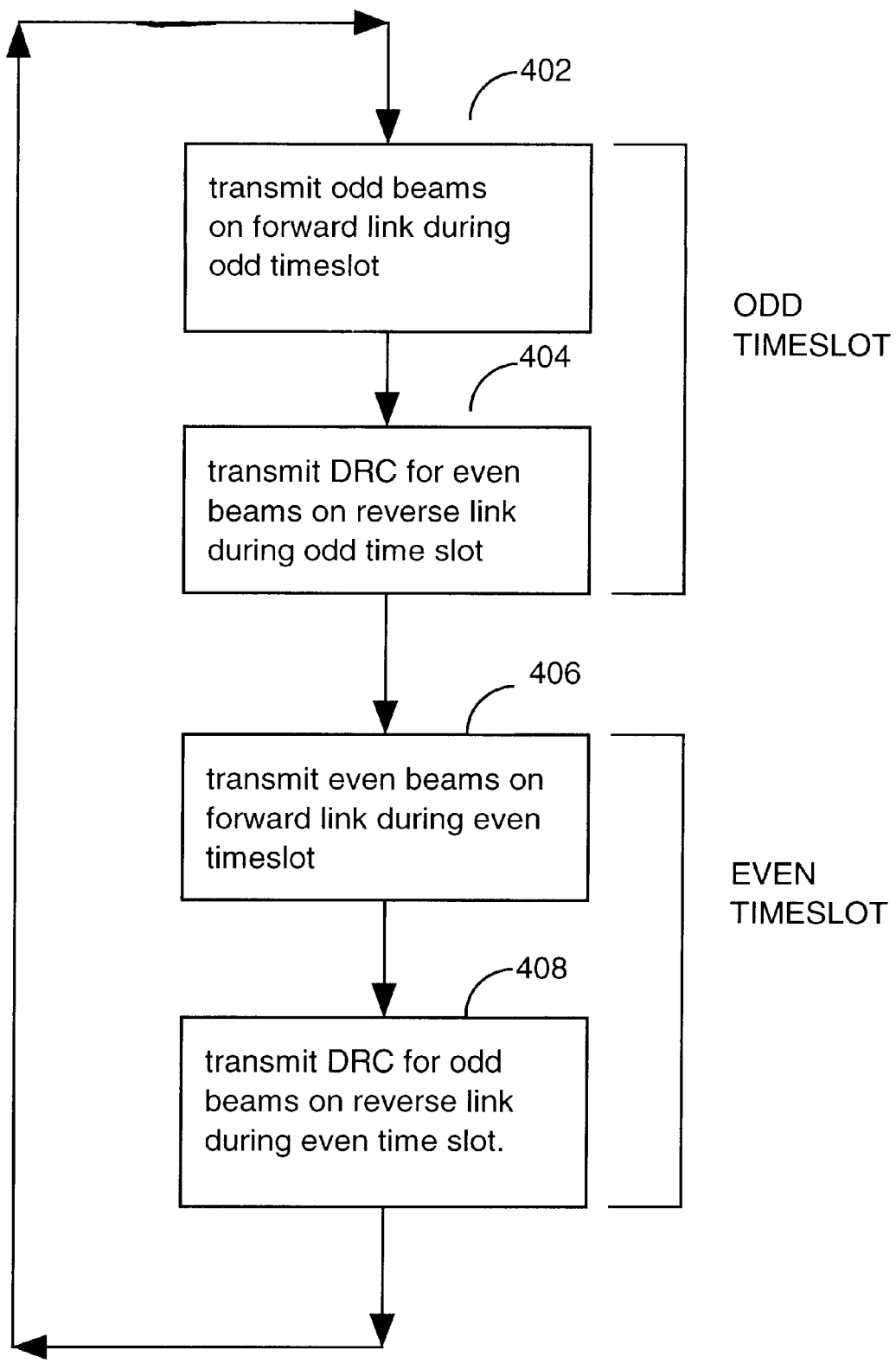
FIG. 4 is a flowchart diagram of a method for increasing system capacity and data rates by maximizing carrier-to-interference ratios (C/I) measured at subscriber stations.

FIG. 4 illustrates method steps in accordance with one embodiment. As previously discussed, system capacity and data rates are increased by maximizing C/I measured at subscriber stations. C/I is maximized using a method of beam switching.

In step 402, odd numbered sub-sector beams are transmitted during odd time slots from the base station on the forward link. Subscriber stations (not shown) receiving data during odd numbered transmission slots receive a data packet, and generate a DRC based on the C/I of the data received. In each transmission time slot there is a pilot signal, or a burst of known signal, being transmitted on the forward link. The subscriber station uses the pilot signal to predict the C/I of the data that it will receive in the next time slot. Based on the estimated C/I, the subscriber station determines the data rate it can support. For a given C/I there is a maximum data rate that the subscriber station can support. The subscriber station uses the pilot signal transmitted in each activated time slot to predict the C/I in the following activated slots, using a look-up table to find the maximum data rate.

In step 404, subscriber stations receiving data during even numbered transmission slots send a DRC to their base stations on the reverse link during the reverse link odd numbered time slots. Every odd time slot, subscriber stations receiving data during even numbered transmission slots send a DRC message to their base stations indicating the data rate at which they can receive. The base stations then transmit to the subscriber stations at the indicated rate during the next even numbered time slot.

In step 406, even numbered sub-sector beams are transmitted during even numbered time slots from the base station on the forward link. Subscriber stations receiving data during even numbered transmission slots receive a data packet, and generate a DRC based on the C/I of the data received.

In step 408, subscriber stations receiving data during odd numbered transmission time slots send a DRC to their base stations on the reverse link during the reverse link even numbered time slots. Every even numbered time slot, subscriber stations receiving data during odd numbered transmission slots sends a DRC message to their base stations indicating the data rate at which it can receive. The base station transmits to the subscriber station at the indicated rate during the next odd numbered time slot.

Figure 5:
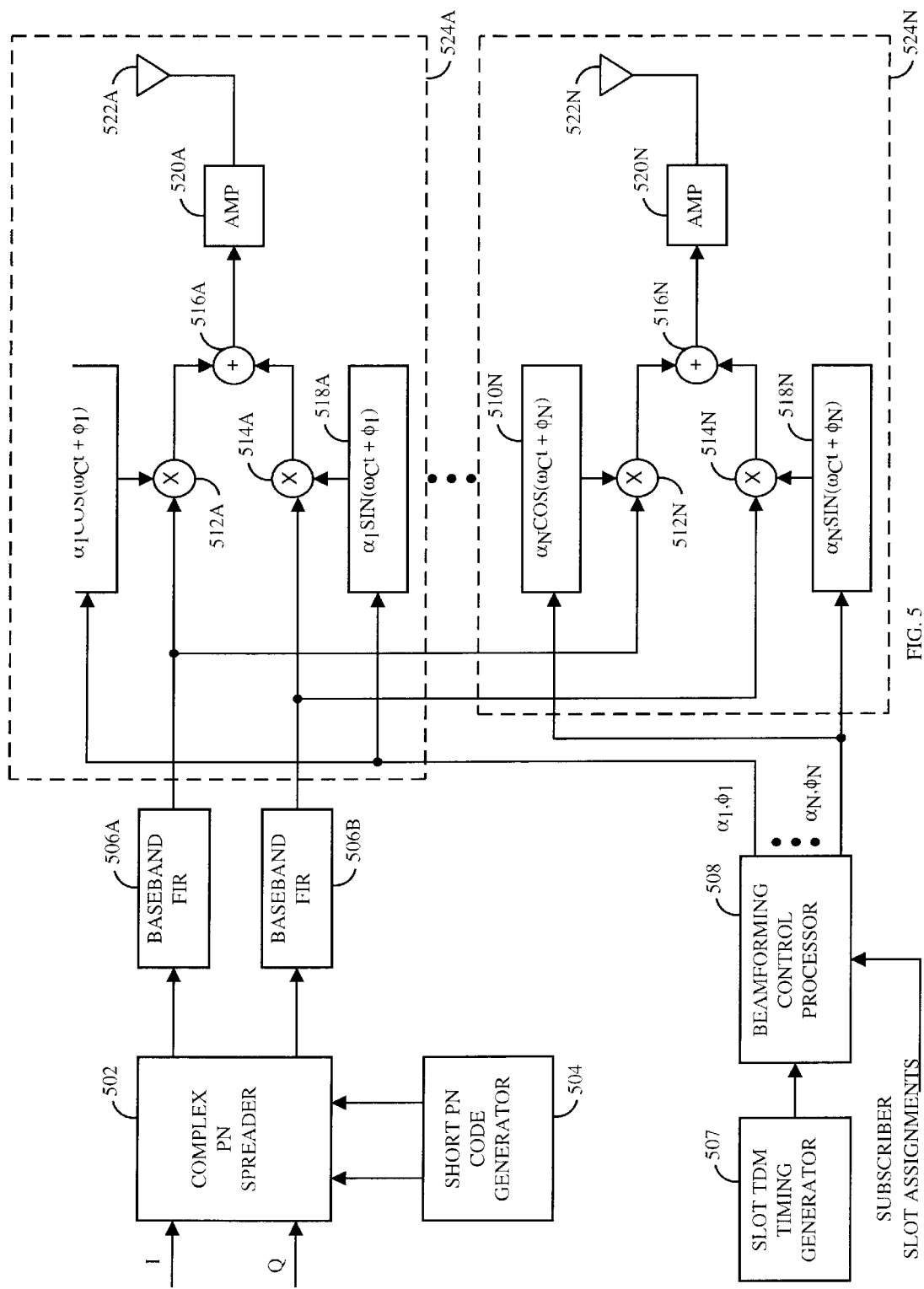
FIG. 5 is a block diagram of a base station apparatus configured in accordance with one embodiment.

FIG. 5 shows a block diagram of an exemplary embodiment of a CDMA base station used to transmit alternating sub-sector beam signals to one or more subscriber stations through multiple transmit antennas. In proposed Third Generation CDMA systems, the signals are modulated using a Quaternary Phase Shift Keyed (QPSK) modulation. In proposed high-data-rate systems, the signals are modulated u sing Eight Phase Shift Keyed (8PSK) and Sixteen Quadrature Amplitude Modulation (16QAM) in addition to QPSK modulation. In order to balance the load on the in-phase (I) and quadrature phase (Q) components of the QPSK signals, a method of complex PN spreading is employed. Complex PN spreading techniques are described in U.S. patent application Ser. No. 08/856,428, entitled "REDUCED PEAK-TO-AVERAGE TRANSMIT POWER HIGH DATA RATE IN A CDMA WIRELESS COMMUNICATION SYSTEM," filed May 14, 1997, assigned to the assignee of the present invention, and incorporated by reference herein.

The data to be transmitted is generated in the form of streams of in-band (I) and quadrature (Q) samples that are provided as input to a complex pseudonoise (PN) spreader 502. Complex PN spreader 502 mixes the I and Q samples with short PN code samples generated by short PN code generator 504. The resulting PN spread sample streams are filtered by baseband finite impulse-response (FIR) filters 506 to generate the baseband complex sample streams to be upconverted and transmitted to subscriber stations (not shown). In accordance with U.S. patent application Ser. No. 08/856,428, the signals provided to baseband FIRs 506 are spread according to the following equations:

$$X_I = I*PN_I - Q*PN_Q \quad (1)$$

$$X_Q = Q*PN_I + I*PN_Q \quad (2)$$

where I are the digital in-phase samples, Q are the digital quadrature-phase samples, $PN_I$ is the in-phase short PN sequence, $PN_Q$ is the quadrature phase short PN sequence, and $X_I$ and $X_Q$ are the signals to be modulated onto the in-phase and quadrature-phase channels respectively. The signal represented by equation (1) is filtered by FIR filter 506A, and the signal represented by equation (2) is filtered by FIR filter 506B. FIR filters 506 act to shape the transmit waveform to fit into the allocated bandwidth and minimize intersymbol interference.

Signals output by FIR filters 506 are provided to the antenna transmission subsystems 524, each antenna transmission subsystem 524 comprising a single transmit antenna 522. Slot TDM timing generator 507 generates timing signals corresponding to the various time-division-multiplex (TDM) transmit periods within each transmit slot. Slot TDM timing generator 507 provides an output signal to beamforming control processor 508, which uses the signal to alternately transmit signals corresponding to the even and odd TDM periods on even and odd sub-sector signal beams.

It is understood by those of skill in the art that the beamforming control processor 508 may encompass a digital signal processor (DSP), an application-specific integrated circuit (ASIC), discrete gate logic, firmware, field-programmable gate arrays (FPGA), programmable logic devices (PLD), or any conventional programmable software module and a microprocessor. The software modules could reside in the processor, RAM memory, flash memory, registers, or any other form of storage medium known in the art. Alternatively, any conventional processor, controller, state machine, or other device capable of generating and adjusting the necessary amplitude and phase control signals could be substituted for the microprocessor. One skilled in the art will appreciate that this does not preclude implementing beamforming control processor 508 function inside another processor already present in the transmitter apparatus.

Based on the signal from slot TDM timing generator 507, beamforming control processor 508 provides separate phase and amplitude control signals, to each antenna transmission subsystem 524. By adjusting the phase and amplitude control signal coefficients to each antenna transmission subsystem 524, beamforming control processor 508 creates sub-sector beams and switches the base station's sub-sector transmit beams on and off according to even and odd time slots. The fixed sets of phase and amplitude coefficients form the sub-sector beams. During active time slots, the beam coefficients are used to form the focused sub-sector beam signals. During inactive time slots, the signal coefficients are set to zero to turn off the sub-sector beam. As shown, beamforming control processor 508 provides amplitude control signal $\alpha_1$ and phase control signal $\phi_1$ to antenna transmission subsystem 524A, and provides amplitude control signal $\alpha_n$ and phase control signal $\phi_n$ to antenna transmission subsystem 524n.

In one embodiment, beamforming control processor 508 maintains a database of the beamforming parameters optimal for each sub-sector beam in the base station's coverage area.

Each antenna transmission subsystem 524 includes the components necessary for upconversion, phase control, amplification, and transmission of the signal through one transmit antenna 522. The signals provided by baseband FIR 506A are mixed in mixer 512A with a mixing signal provided by phase-controlled oscillator 510A. The signals provided by baseband FIR 506B are mixed in mixer 514A with a mixing signal provided by phase-controlled oscillator 518A. As indicated, phase-controlled oscillators 510 and 518 receive amplitude and phase control signals from beamforming control processor 508, which are used to vary the phase and amplitude of their output mixing signals. The output signals of mixers 512A and 514A are added together in summer 516A and provided to amplifier 520A for transmission through transmit antenna 522A. One skilled in the art would appreciate that transmission subsystem 524N and other transmission subsystems (not shown) function similarly to transmission subsystem 524A.

Not shown for each antenna transmission subsystem 524 are digital-to-analog converters (DACs) required to convert the digital signals to analog format prior to amplification and transmission. One skilled in the art will appreciate that there are multiple places in which conversion to analog format may be done without departing from the scope of the present invention.

In one embodiment, each antenna transmission subsystem 524 includes a DAC placed between summer 516 and amplifier 520. In this embodiment, mixers 512 and 514 are digital mixers, and phase-controlled oscillators 510 and 518 generate digital oscillator signals. Each DAC serves to convert the digital output of summer 516 to an analog signal which is then amplified and transmitted by amplifier 520.

In an alternative embodiment, the input signal provided to antenna transmission subsystems 524 is already in analog format (converted to analog prior to being provided to antenna transmission subsystem 524). In this alternative embodiment, phase-controlled oscillators 510 and 518 generate analog mixing signals, mixers 512 and 514 are analog mixers, and summers 516 are analog summers.

One skilled in the art will also appreciate that amplitude control of the signals transmitted through each antenna can be implemented in different ways. In an exemplary embodiment, beamforming control processor 508 provides amplitude control signals to each individual amplifier 520 of each antenna transmission subsystem 524.

One skilled in the art will recognize that the phase-controlled oscillators 510 and 518 may be implemented in a variety of ways. In an exemplary embodiment, a phase-controlled direct digital synthesizer (DDS) may be used to generate a digital sinusoidal signal with very fine phase resolution. In another embodiment, oscillators 510 and 518 are not phase-controlled, but a phase shifter is placed between summer 516 and amplifier 520.

Though two antenna transmission subsystems 524A, 524N are shown in FIG. 5, one or more than one antenna transmission subsystems may be implemented in a beamforming base station. In a typical configuration, where one base station serves one sector divided into four sub-sectors, four antenna transmission subsystems 524 are implemented.

Figure 6:
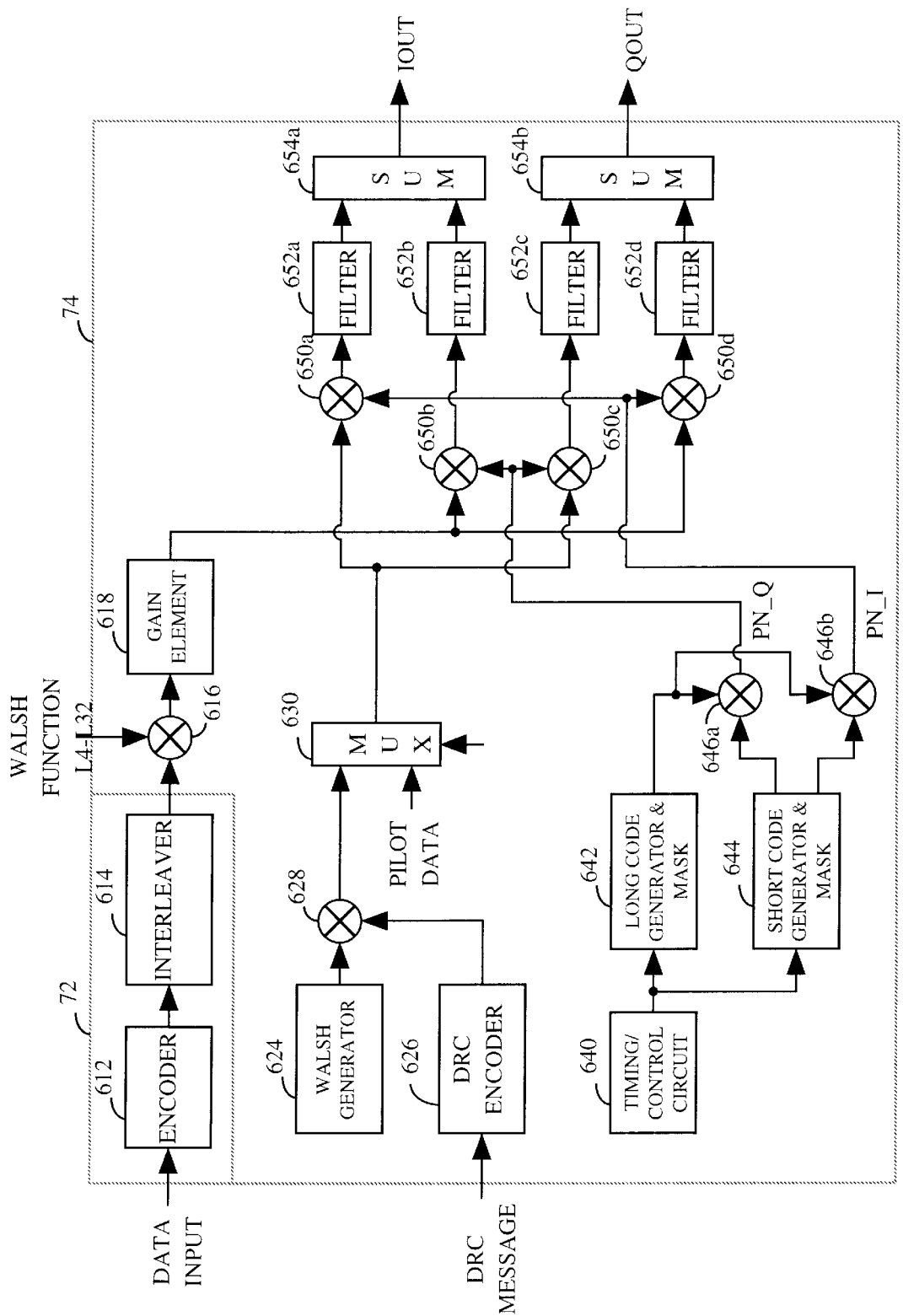
FIG. 6 is a diagram of a portion of a CDMA reverse link subscriber station apparatus configured in accordance with one embodiment.

FIG. 6 is a block diagram of an exemplary reverse link architecture configured in accordance with one embodiment. Data is partitioned into data packets and provided to encoder 612. For each data packet, encoder 612 generates CRC parity bits, inserts code tail bits, and encodes the data. In one embodiment, encoder 612 encodes the packet in accordance with the encoding format disclosed in the aforementioned U.S. patent application Ser. No. 08/743,688, now issued as U.S. Pat. No. 5,933,462, issued on Aug. 3, 1999. Other encoding formats can also be used. The encoded packet from encoder 612 is provided to interleaver 614 which reorders the code symbols in the packet. The interleaved packet is provided to multiplier 616 which covers the data with a Walsh cover and provides the covered data to gain element 618. Gain element 618 scales the data to maintain a constant energy-per-bit $E_b$ regardless of the data rate. The scaled data from gain element 618 is provided to multipliers 650b and 650d which spread the data with PN_Q and PN_I sequences, respectively. The spread data from multipliers 650a and 650d are provided to filters 652b and 652d, respectively, which filter the data. The filtered signals from filters 652a and 652b are provided to summer 654a and the filtered signals from filter 652c and 652d are provided to summer 654b. Summers 654 sum the signals from the data channel with the signals from the pilot/DRC channel. The outputs of summers 654a and 654b comprise IOUT and QOUT, respectively, which are modulated with the in phase sinusoid $COS(w_c t)$ and the quadrature sinusoid $SIN(w_c t)$, respectively (as in the forward link), and summed (not shown) prior to transmission. In the exemplary embodiment, the data traffic is transmitted on both the inphase and quadrature phase of the sinusoid.

In the exemplary embodiment, the data is spread with the long PN code and the short PN codes. The long PN code scrambles the data such that the receiving base station is able to identify the transmitting subscriber station. The short PN code spreads the signal over the system bandwidth. The long PN sequence is generated by long code generator 642 and provided to multipliers 646. The short $PN_I$ and $PN_Q$ sequences are generated by short code generator 644 and also provided to multipliers 646a and 646b, respectively, which multiply the two sets of sequences to form the PN_I and PN_Q signals, respectively. Timing/control circuit 640 provides the timing reference to the PN code generators 642,644. Generation and use of PN sequences is known in the art and described in U.S. Pat. No. 5,103,459.

The exemplary block diagram of the data channel architecture as shown in FIG. 6 is one of numerous architectures which support data encoding and modulation on the reverse link. For high-rate data transmission, an architecture similar to that of the forward link utilizing multiple orthogonal channels can also be used. Other architectures, such as the architecture for the reverse link traffic channel in the CDMA system which conforms to the IS-95 standard, are also contemplated and are within the scope of the present invention.

In the exemplary embodiment, the reverse link data channel supports four data rates which are tabulated in Table 1. Additional data rates and/or different data rates can be supported. In the exemplary embodiment, the packet size for the reverse link is dependent on the data rate, as shown in Table 1. As described in the aforementioned U.S. patent application Ser. No. 08/743,688, now issued as U.S. Pat. No. 5,933,462, issued on Aug. 3, 1999, improved decoder performance can be obtained for larger packet sizes. Thus, different packet sizes than those listed in Table 1 can be utilized to improve performance. In addition, the packet size can be made a parameter which is independent of the data rate.

TABLE 1

Pilot and Power Control Modulation Parameters

| Parameter | Data rates | | | | Units |
|---|---|---|---|---|---|
| | 9.6 | 19.2 | 38.4 | 76.8 | Kbps |
| Frame duration | 26.66 | 26.66 | 13.33 | 13.33 | msec |
| Data packet length | 245 | 491 | 491 | 1003 | bits |
| CRC length | 16 | 16 | 16 | 16 | bits |
| Code tail bits | 5 | 5 | 5 | 5 | bits |
| Total bits/packet | 256 | 512 | 512 | 1024 | bits |
| Encoded packet length | 1024 | 2048 | 2048 | 4096 | symbols |
| Walsh symbol length | 32 | 16 | 8 | 4 | chips |
| Request required | no | yes | yes | yes | |

As shown in Table 1, the reverse link supports a plurality of data rates. In the exemplary embodiment, the lowest data rate of 9.6 Kbps is allocated to each subscriber station upon registration with a base station. In the exemplary embodiment, subscriber stations can transmit data on the lowest-rate data channel at any time slot without having to request permission from a base station. In the exemplary embodiment, data transmissions at the higher data rates are granted by the selected base station based on a set of system parameters such as system loading, fairness, and total throughput. An exemplary scheduling mechanism for high speed data transmission is described in detail in U.S. patent application Ser. No. 08/798,951, now issued U.S. Pat. No. 6,335,922, issued on Jan. 1, 2002, entitled "METHOD AND APPARATUS FOR FORWARD LINK RATE SCHEDULING," filed Feb. 11, 1997, and U.S. patent application Ser. No. 08/914,928, now issued U.S. Pat. No. 5,923,650, issued on Jul. 13, 1999, entitled "METHOD AND APPARATUS FOR REVERSE LINK RATE SCHEDULING," filed Aug. 20, 1997, both are assigned to the assignee of the present invention and incorporated by reference herein.

The exemplary block diagram of the pilot/DRC channel is shown in FIG. 6. The DRC message is provided to DRC encoder 626 which encodes the message in accordance with a predetermined coding format. Coding of the DRC message is important since the error probability of the DRC message needs to be sufficiently low because incorrect forward link data rate determination impacts the system throughput performance. In the exemplary embodiment, DRC encoder 626 is a rate (8,4) block encoder which encodes the DRC message into a code word. The encoded DRC message is provided to multiplier 628 which covers the message with the Walsh code which uniquely identifies the destination base station for which the DRC message is directed. The Walsh code is provided by Walsh generator 624. The covered DRC message is provided to multiplexer (MUX) 630 which multiplexes the message with pilot data. The DRC message and the pilot data are provided to multipliers 650a and 650c which spread the data with the PN_I and PN_Q signals, respectively. Thus, the pilot and DRC message are transmitted on both the inphase and quadrature phase of the sinusoid.

In the exemplary embodiment, the DRC message is transmitted to the selected base station. This is achieved by covering the DRC message with the Walsh code that identifies the selected base station. In the exemplary embodiment, the Walsh code is 128 chips in length. The derivation of 128-chip Walsh codes is known in the art. One unique Walsh code is assigned to each base station which is in communication with the subscriber station. Each base station decovers the signal on the DRC channel with its assigned Walsh code. The selected base station is able to decover the DRC message and transmits data to the requesting subscriber station on the forward link in response thereto. Other base stations are able to determine that the requested data rate is not directed to them because these base stations are assigned different Walsh codes.

In the exemplary embodiment, the reverse link short PN codes for all base stations in the data communication system are the same and there is no offset in the short PN sequences to distinguish different base stations. The data communication system advantageously supports soft handoff on the reverse link. Using the same short PN codes with no offset allows multiple base stations to receive the same reverse link transmission from a subscriber station during a soft handoff. Thus the short PN codes provide spectral spreading but advantageously do not allow for identification of base stations.

In the exemplary embodiment, the DRC message carries the data rate requested by the subscriber station. In an alternative embodiment, the DRC message carries an indication of the forward link quality (e.g., the C/I information as measured by the subscriber station). During acquisition, a subscriber station can simultaneously receive the forward link pilot signals from one or more sub-sector beams and perform the C/I measurement on each received pilot signal. During acquisition, a subscriber station searches and makes measurements for pilots on both even and odd numbered time slots. The subscriber station selects the beam with the highest C/I. The subscriber station subsequently sends DRC messages on the reverse link during the opposite reverse link time slot from the forward link time slot in which it receives data. The subscriber station switches from even to odd numbered time slots (or vice versa) if it crosses in to a new sub-sector. After acquisition, the C/I is estimated by the subscriber station as described in U.S. Pat. No. 5,504,773, except that the C/I is measured only on the alternating even or odd time slot when data is received. The subscriber station then selects the best sub-sector beam based on a set of parameters which can comprise present and previous C/I measurements. The rate control information is formatted into the DRC message which can be conveyed to the base station in one of several embodiments.

In a first embodiment, the subscriber station transmits a DRC message based on the requested data rate. The requested data rate is the highest supported data rate that yields satisfactory performance at the C/I measured by the subscriber station. From the C/I measurement, the subscriber station first calculates the maximum data rate which yields satisfactory performance. The maximum data rate is then quantized to one of the supported data rates and designated as the requested data rate. The data rate index corresponding to the requested data rate is transmitted to the selected base station. An exemplary set of supported data rates and the corresponding data rate indices are shown in Table 1.

In another embodiment, wherein the subscriber station transmits an indication of the forward link quality to the selected base station, a subscriber station transmits a C/I index which represents the quantized value of the C/I measurement. The C/I measurement can be mapped to a table and associated with a C/I index. Using more bits to represent the C/I index allows a finer quantization of the C/I measurement. Also, the mapping can be linear or predistorted. For a linear mapping, each increment in the C/I index represents a corresponding increase in the C/I measurement. For example, each step in the C/I index can represent a 2.0 dB increase in the C/I measurement. For a predistorted mapping, each increment in the C/I index can represent a different increase in the C/I measurement. As an example, a predistorted mapping can be used to quantize the C/I measurement to match the cumulative distribution function (CDF) curve of the C/I distribution.

Other embodiments to convey the rate control information from a subscriber station to a base station can be contemplated and are within the scope of the present invention. Furthermore, the use of different number of bits to represent the rate control information is also within the scope of the present invention.

In an exemplary embodiment, the C/I measurement can be performed on the forward link pilot signal in a manner similar to that used in a CDMA system. A method and apparatus for performing the C/I measurement is disclosed in U.S. patent application Ser. No. 08/722,763, now issued U.S. Pat. No. 5,903,554, issued on May 11, 1999, entitled "METHOD AND APPARATUS FOR MEASURING LINK QUALITY IN A SPREAD SPECTRUM COMMUNICATION SYSTEM," filed Sep. 27, 1996, assigned to the assignee of the present invention, and incorporated by reference herein. The C/I measurement on the pilot signal can be obtained by despreading the received signal with the short PN codes.

In an alternative embodiment, the C/I measurement can be performed on the forward link traffic channel. The traffic channel signal is first despread with the long PN code and the short PN codes and decovered with the Walsh code. The C/I measurement on the signals on the data channels can be more accurate because a larger percentage of the transmitted power is allocated for data transmission. Other methods to measure the C/I of the received forward link signal by a subscriber station are also contemplated and are within the scope of the present invention.

In the exemplary embodiment, the DRC message is transmitted in the first half of the time slot. For an exemplary time slot of 1.667 msec, the DRC message comprises the first 1024 chips or 0.83 msec of the time slot. The remaining 1024 chips of time are used by the base station to demodulate and decode the DRC message. Transmission of the DRC message in the earlier portion of the time slot allows the base station to decode the DRC message within the same time slot and possibly transmit data at the requested data rate in the immediately successive time slot. The short processing delay allows the communication system to quickly adopt to changes in the operating environment.

In the alternative embodiment, the requested data rate is conveyed to the base station by the use of an absolute reference and a relative reference. In this embodiment, the absolute reference comprising the requested data rate is transmitted periodically. The absolute reference allows the base station to determine the exact data rate requested by a subscriber station. For each time slot between transmissions of the absolute reference, a subscriber station transmits a relative reference to the base station which indicates whether the requested data rate for the upcoming time slot is higher, lower, or the same as the requested data rate for the previous time slot. Periodically, the subscriber station transmits an absolute reference. Periodic transmission of the data rate index allows the requested data rate to be set to a known state and ensures that erroneous receptions of relative references do not accumulate. The use of absolute references and relative references can reduce the transmission rate of the DRC messages to the base station. Other protocols to transmit the requested data rate are also contemplated and are within the scope of the present invention.

The presently disclosed embodiments provide a method of utilizing sub-sector beam switching techniques to decrease the average interference caused by transmissions of a base station to subscriber stations within a cell, and in neighboring cells.

Thus, a novel and improved method and apparatus for improved forward link data transmission has been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software modules could reside in RAM memory, flash memory, ROM memory, EPROM memory, EEPROM memory, registers, hard disk, a removable disk, a CD-ROM, or any other form of storage medium known in the art. The processor may reside in an ASIC (not shown). The ASIC may reside in a telephone (not shown). In the alternative, the processor may reside in a telephone. The processor may be implemented as a combination of a DSP and a microprocessor, or as two microprocessors in conjunction with a DSP core, etc.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for beam switching in a wireless communication system having at least one base station located within a cell which is divided into sector and sub-sector divisions, said base station configured to transmit fixed signal beams to the sub-sector divisions during transmission time slots, wherein one half of the signal beams are identified as odd and another half of the signal beams are identified as even with like identified beams not adjacently located, and one half of the time slots are identified as odd and another half of the time slots are identified as even, the method comprising:

transmitting the odd identified beams only during odd identified time slots;

transmitting the even identified beams only during even identified time slots; and receiving, at the base station, a data rate control message transmitted from a subscriber station on a reverse link during a reverse link transmission time slot having an identification antipodal to the identification of the time slot in which the subscriber station is receiving data on a forward link.

2. A method for beam switching in a wireless communication system having at least one base station located within a cell which is divided into sector and sub-sector divisions, said base station configured to transmit fixed signal beams to the sub-sector divisions during transmission time slots, wherein one half of the signal beams are identified as odd and another half of the signal beams are identified as even with like identified beams not adjacently located, and one half of the time slots are identified as odd and another half of the time slots are identified as even, the method comprising:

transmitting the odd identified beams only during odd identified time slots;

transmitting the even identified beams only during even identified time slots, wherein the odd identified beams contain information identical to the information contained in the even identified beams.

3. A method for transmitting signals in a cell defined by alternating sections of first and second sets of sections, comprising:

transmitting the signals in the first set of sections in a first time slot when a data rate control message is received from a subscriber station during a first reverse link time slot; and transmitting the signals in the second set of sections in a second time slot when a data rate control message is received from a subscriber station during a second reverse link time slot.

4. A method for transmitting signals in a cell defined by alternating sections of first and second sets of sections, comprising:

transmitting the signals in sections of the first set of sections in a first time slot; and transmitting the signals in sections of the second set of sections in a second time slot, wherein the signals transmitted in the first set of sections contain information identical to the information transmitted in the second set of sections.

5. A transmitter for transmitting signals in a cell defined by alternating sections of first and second sets of sections, comprising:

means for transmitting the signals in the first set of sections in a first time slot when a data rate control message is received from a subscriber station during a first reverse link time slot; and means for transmitting the signals in the second set of sections in a second time slot when a data rate control message is received from a subscriber station during a second reverse link time slot.

6. A transmitter for transmitting signals in a cell defined by alternating sections of first and second sets of sections, comprising:

means for transmitting the signals in sections of the first set of sections in a first time slot; and means for transmitting the signals in sections of the second set of sections in a second time slot, wherein the signals transmitted in the first set of sections contain information identical to the information transmitted in the second set of sections.

7. A wireless communication system, comprising:

a subscriber station; and a transmitter for transmitting signals to the subscriber station in a cell defined by alternating sections of first and second sets of sections;

wherein the transmitter transmits the signals in the first set of sections in a first time slot when a data rate control message is received from the subscriber station during a first reverse link time slot and transmits the signals in the second set of sections in a second time slot when a data rate control message is received from the subscriber station during a second reverse link time slot.

8. A wireless communication system, comprising:

a subscriber station; and a transmitter for transmitting signals to the subscriber station in a cell defined by alternating sections of first and second sets of sections;

wherein the transmitter transmits the signals in sections of the first set of sections in a first time slot and transmits the signals in sections of the second set of sections in a second time slot, wherein the signals transmitted in the first set of sections contain information identical to the information transmitted in the second set of sections.

9. A base station located within a cell which is divided into sector and sub-sector divisions, said base station configured to transmit fixed signal beams to the sub-sector divisions during transmission time slots, wherein one half of the signal beams are identified as odd and another half of the signal beams are identified as even with like identified beams not adjacently located, and one half of the time slots are identified as odd and another half of the time slots are identified as even, comprising:

means for transmitting the odd identified beams only during odd identified time slots;

means for transmitting the even identified beams only during even identified time slots; and means for receiving a data rate control message transmitted from a subscriber station on a reverse link during a reverse link transmission time slot having an identification antipodal to the identification of the time slot in which the subscriber station is receiving data on a forward link.

10. A base station located within a cell which is divided into sector and sub-sector divisions, said base station configured to transmit fixed signal beams to the sub-sector divisions during transmission time slots, wherein one half of the signal beams are identified as odd and another half of the signal beams are identified as even with like identified beams not adjacently located, and one half of the time slots are identified as odd and another half of the time slots are identified as even, comprising:

means for transmitting the odd identified beams only during odd identified time slots; and means for transmitting the even identified beams only during even identified time slots, the odd identified beams contain information identical to the information contained in the even identified beams.

* * * * *